United States Patent
Zhou et al.

(10) Patent No.: US 10,837,840 B2
(45) Date of Patent: Nov. 17, 2020

(54) MOUNTING SYSTEM FOR A WIRELESS TEMPERATURE SENSOR

(71) Applicant: Google LLC, Mountain View, CA (US)

(72) Inventors: Mi Zhou, San Jose, CA (US); Emma Feshbach, San Francisco, CA (US); Arun Prakash Raghupathy, Pleasanton, CA (US); Jason Goulden, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 277 days.

(21) Appl. No.: 15/953,750

(22) Filed: Apr. 16, 2018

(65) Prior Publication Data

US 2019/0316970 A1 Oct. 17, 2019

(51) Int. Cl.
*G01K 1/14* (2006.01)
*G01K 1/02* (2006.01)
*G01K 7/00* (2006.01)

(52) U.S. Cl.
CPC .............. *G01K 1/14* (2013.01); *G01K 1/024* (2013.01); *G01K 7/00* (2013.01)

(58) Field of Classification Search
CPC ............. G01K 1/14; G01K 1/024; G01K 7/00
See application file for complete search history.

(56) References Cited

U.S. PATENT DOCUMENTS

| | | | | |
|---|---|---|---|---|
| 2,846,881 A * | 8/1958 | Hobin | ..................... | G01K 5/025 374/189 |
| 8,779,288 B1 * | 7/2014 | Baldwin | .................. | H02G 3/14 174/53 |
| 9,331,315 B1 | 5/2016 | Goulden et al. | | |
| 2001/0032516 A1 | 10/2001 | Gul | | |
| 2006/0237673 A1 * | 10/2006 | Muderlak | ................. | E03D 3/00 251/129.04 |
| 2007/0096920 A1 * | 5/2007 | Cargonja | ............... | G08B 25/10 340/572.8 |
| 2008/0315063 A1 * | 12/2008 | Gallien | ................... | F16B 21/09 248/544 |

(Continued)

FOREIGN PATENT DOCUMENTS

| | | |
|---|---|---|
| AU | 2012313521 A1 | 4/2014 |
| CN | 206210885 U | 5/2017 |
| EP | 1496273 B1 | 10/2007 |

OTHER PUBLICATIONS

Extended European Search Report dated Sep. 19, 2019 in European Patent Application No. 19164290.9, all pages.

*Primary Examiner* — Nathaniel T Woodward
*Assistant Examiner* — Philip L Cotey
(74) *Attorney, Agent, or Firm* — Kilpatrick Townsend & Stockton LLP

(57) ABSTRACT

Various arrangements are presented that detail a wall mounting system for a wireless sensor device, such as a wireless temperature sensor device. A flanged fastener that includes a first flange and a second flange may be present. The first flange can prevent the flanged fastener from being inserted more than a defined distance into a surface. The second flange may be removably insertable into a mounting hole present on a backplate of the wireless sensor. The system can further include a wireless sensor unit that includes the backplate. The wireless sensor is removably attachable to the flanged fastener while the flanged fastener is inserted into the surface.

18 Claims, 15 Drawing Sheets

(56) References Cited

U.S. PATENT DOCUMENTS

| | | | |
|---|---|---|---|
| 2009/0165319 A1 | 7/2009 | Gallien | |
| 2011/0255250 A1* | 10/2011 | Dinh | G03B 15/03 |
| | | | 361/749 |
| 2012/0128025 A1 | 5/2012 | Huppi et al. | |
| 2015/0070181 A1* | 3/2015 | Fadell | G08B 21/22 |
| | | | 340/628 |
| 2016/0116183 A1* | 4/2016 | Lazar | G05D 23/1905 |
| | | | 236/1 C |
| 2016/0377659 A1* | 12/2016 | Tiemann | F16B 21/073 |
| | | | 403/326 |
| 2018/0306378 A1* | 10/2018 | Carpenter | F16B 21/09 |

* cited by examiner

MOUNTING SYSTEM FOR A WIRELESS TEMPERATURE SENSOR

BACKGROUND

A thermostat typically performs multiple functions: control a heating, ventilation, and air conditioning (HVAC) system and sense an ambient temperature to use in controlling the HVAC system. Such an arrangement may have the disadvantage of the thermostat controlling the HVAC system based on the temperature near the thermostat. In some structures (e.g., houses, buildings, offices, apartments, condominiums, warehouses), the temperature near the thermostat may be of less importance than a temperature elsewhere in the structure. For example, a thermostat may be located in a hallway while one or more occupants tend to spend most of their time in the structure's bedrooms or living room. Such one or more occupants may be more interested in having the HVAC system be controlled based on the temperature in the areas of the structure where the one or more occupants tend to spend their time or otherwise deem important. In the typical situation in which the thermostat is connected to in-wall control wires that transmit signals to the HVAC system, it may be difficult or inconvenient for the thermostat to be placed in the specific location at which the occupants want to have the temperature measured and used for controlling the HVAC system.

SUMMARY

In some embodiments, a wall mounting system for a wireless sensor device is presented. The wall mounting system may include a flange fastener comprising a first flange and a second flange. The first flange may prevent the flanged fastener from being inserted more than a defined distance into a wall. The second flange may be removably insertable into a mounting hole present on a backplate of a wireless sensor device. The first flange may be located a distance apart from the second flange on the flanged fastener. The wall mounting system further comprising the backplate of the wireless sensor device, wherein the backplate may be removably attachable to the flanged fastener while the flanged fastener is inserted into the wall.

Embodiments may include one or more of the following features: The backplate may be at least partially made of a compressible material and the compressible material may be compressed between the first flange and the second flange when the wireless sensor device is attached with the flanged fastener. The backplate may be formed such that the mounting hole has a first portion larger than the second flange in diameter and a second portion smaller than the second flange in diameter. A center of gravity of the wireless sensor device may be located directly below the mounting hole in a plane that is parallel to the backplate of the wireless sensor device. The compressible material may be a non-slip thermoplastic polyurethane (TPU). The wireless sensor device may include a temperature sensor and the wireless sensor device may transmit, using a wireless communication protocol, temperature measurements to a thermostat. The backplate may include a permanently-attached screw fastener and the permanently-attached screw fastener may screw into screw threads in a chassis of the wireless sensor device. The backplate may include a protruding tongue and a housing of wireless sensor device may include a groove into which the protruding tongue removably fits. When the protruding tongue is removably inserted into the groove, the permanently-attached screw fastener may be aligned for screwing into the screw threads in the chassis of the wireless sensor device in a correct orientation. 1. The backplate may include a guard lip. The guard lip may protrude from the backplate into the wireless sensor device. The guard lip may block the second flange from entering a battery compartment of the wireless sensor device. The flange fastener may be a flange screw.

In some embodiments, a temperature sensor device is presented. The temperature sensor device may include a housing. The temperature sensor device may include a wireless transceiver within the housing. The temperature sensor device may include a battery compartment within the housing. The temperature sensor device may include a temperature sensor within the housing. The temperature sensor device may include a backplate that defines a mounting hole. The temperature sensor device may include a flange screw comprising a first flange and a second flange. The first flange may prevent the flanged screw from being inserted more than a distance into a wall. The second flange may be removably insertable into the mounting hole defined by the backplate. The first flange may be located a distance apart from the second flange on the flanged screw. The temperature sensor device may be removably attachable to the flanged screw while the flanged screw is inserted into the wall.

Embodiments of such a temperature sensor device may include one or more of the following features: The backplate may be at least partially made of a compressible material and the compressible material may be compressed between the first flange and the second flange when the backplate is coupled with the flanged screw. The backplate may be formed such that the mounting hole has a first portion larger than the second flange in diameter and a second portion smaller than the second flange in diameter. A center of gravity of the temperature sensor device may be located directly below the mounting hole in a plane that is parallel to the backplate of the temperature sensor device. The compressible material may be a non-slip thermoplastic polyurethane (TPU). The temperature sensor device may periodically transmit temperature measurements according to a defined schedule to a thermostat. The temperature sensor device may transmit a temperature measurement once every 10 seconds. The backplate comprises a permanently-attached screw fastener and the permanently-attached screw fastener attaches to screw threads in a chassis of the temperature sensor device. The backplate may include a protruding tongue and a housing of wireless sensor device may include a groove into which the protruding tongue removably fits. When the protruding tongue is removably inserted into the groove, the permanently-attached screw fastener may be aligned for screwing into the screw threads in the chassis of the temperature sensor device in a correct orientation. The backplate may include a guard lip. The guard lip may protrude from the backplate into the temperature sensor device. The guard lip may block the second flange from entering a battery compartment of the temperature sensor device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
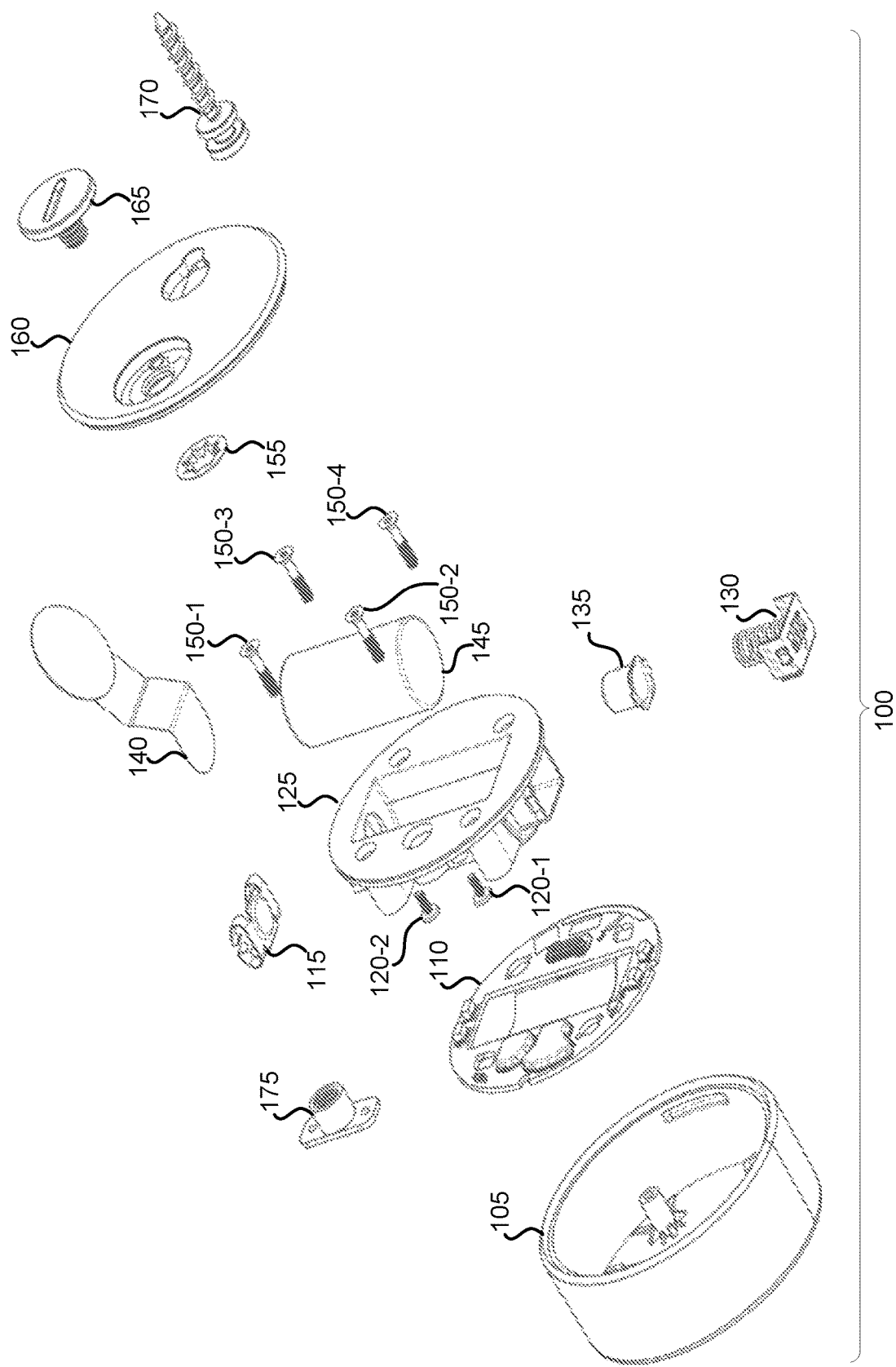
FIG. 1A illustrates an exploded bottom view of a temperature sensor device.

Embodiments detailed herein describe a wireless temperature sensor device that can be placed at a remote location from a thermostat and wirelessly transmit temperature measurements to the thermostat. The wireless temperature sensor device (referred to as the "device" for short) can provide periodic or occasional temperature measurements to the thermostat using wireless communication. The thermostat can use the temperature measurements made by the temperature sensor to compare with a setpoint temperature set at the thermostat and control the HVAC system based on the comparison. In some embodiments, the thermostat exclusively uses the temperature measurements received from the temperature sensor to control the HVAC system; in other embodiments, the thermostat may use the temperature measurements to control the HVAC system during particular time periods during the day (and, possibly, on certain days of the week); in still other embodiments, temperature measurements made using one or more temperature sensors and/or directly by the thermostat may be used together (e.g., averaged, based on the lowest measured temperature, based on the highest measured temperature) to control the HVAC system.

The wireless temperature sensor device may be a single unit that includes a power source (e.g., one or more batteries) and can be placed in a variety of types of locations. For instance, the temperature sensor may be designed such that it can lay on a flat surface, such as a shelf or table. The temperature sensor may also be designed such that it can be mounted to a wall, such as using a single double-flanged screw. Various features, as to be detailed herein in relation to the figures, allow the temperature sensor device to be easily mounted to a wall in an aesthetically-pleasing arrangement. Further, to provide even more finite temperature control, the height at which the temperature sensor device is placed may be selected based on the height in a room at which a user desires the temperature controlled (e.g., the height within the room where the user tends to spend time). For example, the temperature sensor device may be placed at a lower height if a user (or other occupants) tend to sit down in the room (e.g., sitting on a couch in a living room), while the temperature sensor device may be placed at a higher height if the user (or other occupants) tend to stand in the room (e.g., standing at a counter in a kitchen).

The temperature sensor device may be small, which may allow it to be unobtrusive within the environment in which the temperature sensor is located. For instance, the temperature sensor device may be between 20-30 mm thick or height (representing the distance from the back surface of the backplate to the crown on the front of the housing) and between 40-60 mm in diameter, width, or length. In some embodiments, diameter is 50 mm and the thickness or height is 22.5 mm. The temperature sensor may be generally cylindrical in shape with a convex front that faces away from a mounting surface. In other embodiments, the face of the device may be flat. The temperature sensor device may have no exposed wires, exposed power connections, or exposed electrical connections of any kind. In order to realize a diminutive size while still providing a robust, drop-resistant device, the temperature sensor may have various features as detailed herein in relation to the figures.

While embodiments detailed herein refer to temperature sensing, it should be understood that features of the embodiments may be used in addition or in alternate for sensing of other environmental conditions, such as humidity, water, occupancy (e.g., via a passive infrared sensor), etc. A single device may sense multiple types of environmental conditions. Additionally, the temperature sensor device detailed herein may be used for temperature sensing applications other than in concert with a thermostat that controls an HVAC system. For instance, embodiments of such a temperature sensor may be used to monitor a temperature inside a refrigerator or freezer to determine if the cooling of the appliance has failed or a door has been left open. Embodiments of such a device could be used to sense if an appliance, such as a stove or oven, has been left turned on. Embodiments of such a device may be used to measure an outside temperature (e.g., for informational purposes for an occupant) or a living area for animals (e.g., doghouse, livestock structure, etc.). Such a device may also be used to control a secondary HVAC system, such as an attic fan or swamp cooler.

Figure 1B:
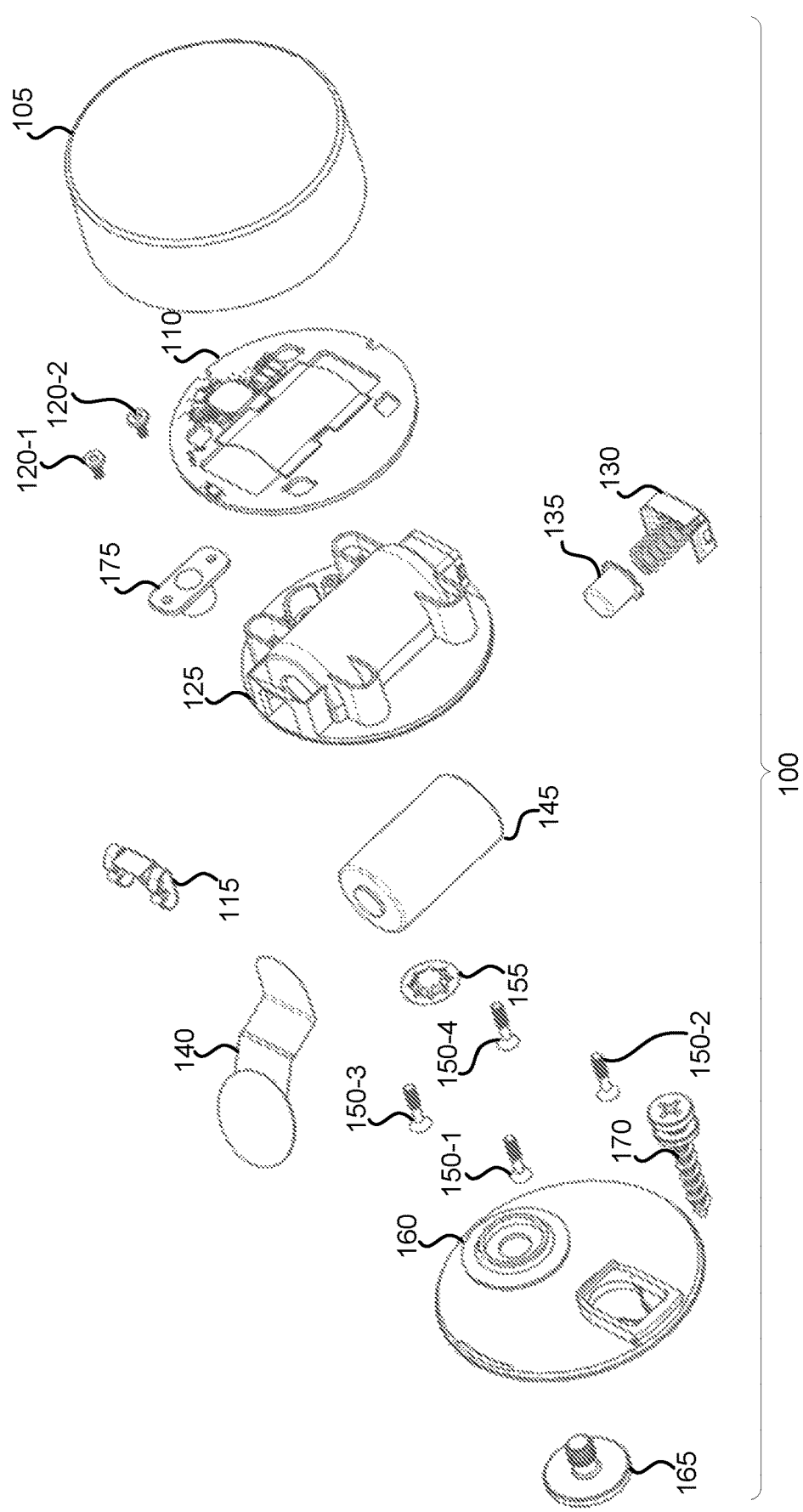
FIG. 1B illustrates an exploded top view of a temperature sensor device.

FIG. 1A illustrates an exploded bottom view of temperature sensor device 100 (also referred to as "device 100"). FIG. 1B illustrates an exploded top view of temperature sensor device 100. Temperature sensor device 100 may be assembled as a single unit. Temperature sensor device 100 may include: housing 105; printed circuit board (PCB) 110; positive battery terminal assembly 115; chassis screws 120; chassis 125; negative battery terminal assembly 130; negative battery terminal cap 135; battery pull tab 140; battery 145; chassis screws 150 (150-1, 150-2, 150-3, 150-4); coin screw lock 155; backplate 160; coin screw 165; double flange screw 170; and coin screw thread structure 175. It some embodiments, additional or fewer components are incorporated as part of temperature sensor device 100. For example, embodiments may not include battery 145, battery pull tab 140, double flange screw 170, and/or various other components. Housing 105 may include a front surface that will face away from a surface on which temperature sensor device 100 is placed or affixed.

Housing 105 may be a single piece of material that has a continual and, possibly, cylindrical sidewall. As such, when device 100 is placed on a horizontal surface with housing 105 facing up, housing 105 may effectively make device 100 water resistant to splashes or incidental water, at least partially due to housing 105 being formed from a single piece of material. No holes may be present in housing 105 in either a front face of housing 105 or the cylindrical sidewall of housing 105. Backplate 160 may be removable from chassis 125 and detachable from device 100. A user may be able to turn coin screw 165 to release backplate 160 from chassis 125. With backplate 160 removed, battery 145 may be accessible. Battery pull tab 140 may be initially installed following manufacture such that battery 145 is electrically disconnected from positive battery terminal assembly 115. Battery pull tab 140 may be present between backplate 160 and chassis 125 while backplate 160 is attached with chassis 125. Battery pull tab 140 may be shaped such that a user can grasp battery pull tab 140 and pull it away from backplate 160 without removing backplate 160 from chassis 125. As such, a user may initiate operation of device 100 by removing battery pull tab 140, which causes a positive battery terminal of battery 145 to become in electrical contact with positive battery terminal assembly 115. Therefore, it should be understood that battery pull tab 140 is intended to only be temporarily attached with device 100 and may not be considered part of device 100.

Chassis screws 150 may serve to fasten chassis 125 to housing 105. PCB 110 may attach with housing 105 and may be secured in place by chassis 125 and chassis screws 150. In device 100, four chassis screws 150 are illustrated. It should be understood that in other embodiments, fewer or greater number of chassis screws may be present.

Figure 2A:
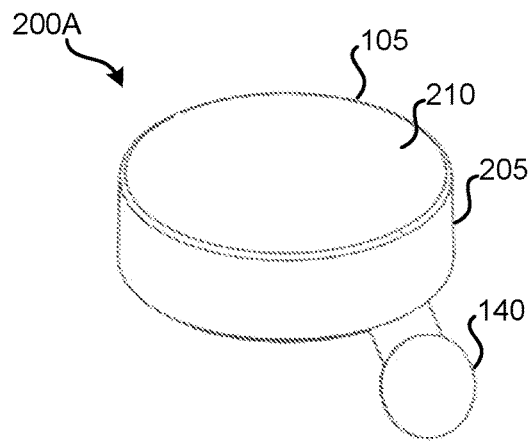
FIGS. 2A and 2B illustrate front perspective views of the temperature sensor device.
Figure 2B:
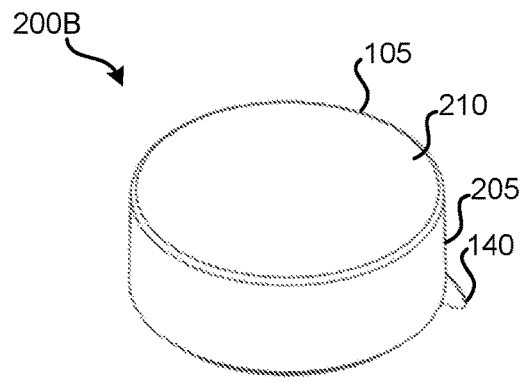

FIGS. 2A and 2B illustrate front perspective views 200A and 200B of temperature sensor device 100. In FIGS. 2A and 2B, the single piece of material that forms housing 105 is visible. Housing 105 may be injection molded plastic. Sidewall 205 of housing 105 may be cylindrical. Top surface 210 of housing 105 may be convex. Battery pull tab 140 may only be present prior to installation and/or configuration by a user. A user may remove battery pull tab 140 to initiate operation of temperature sensor device 100. Battery pull tab 140 may then be recycled or discarded.

Figure 2C:
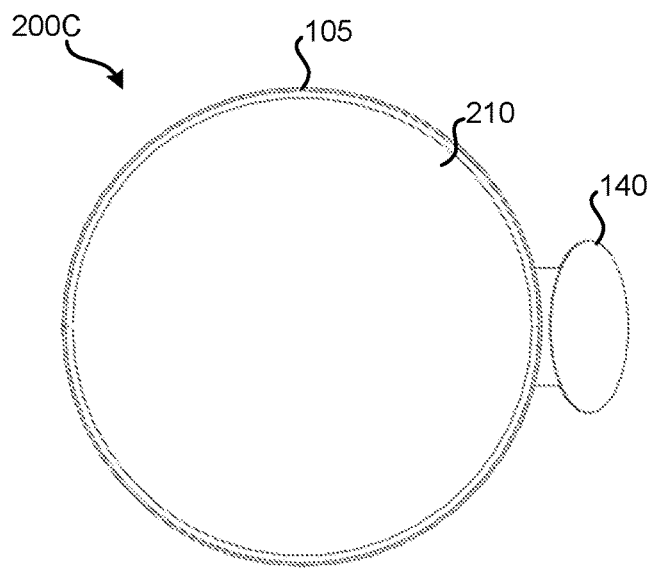
FIG. 2C illustrates a front view of the temperature sensor device.
Figure 2D:
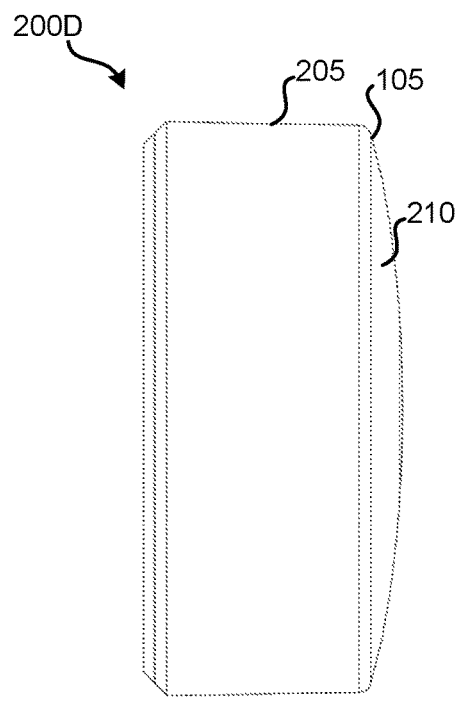
FIG. 2D illustrates a side view of the temperature sensor device.

FIG. 2C illustrates a front view 200C of the temperature sensor device. Battery pull tab 140 may not be present in various embodiments. FIG. 2D illustrates side view 200D of the temperature sensor device. Side view 200D may represent device 100 view from any side.

Figure 3:
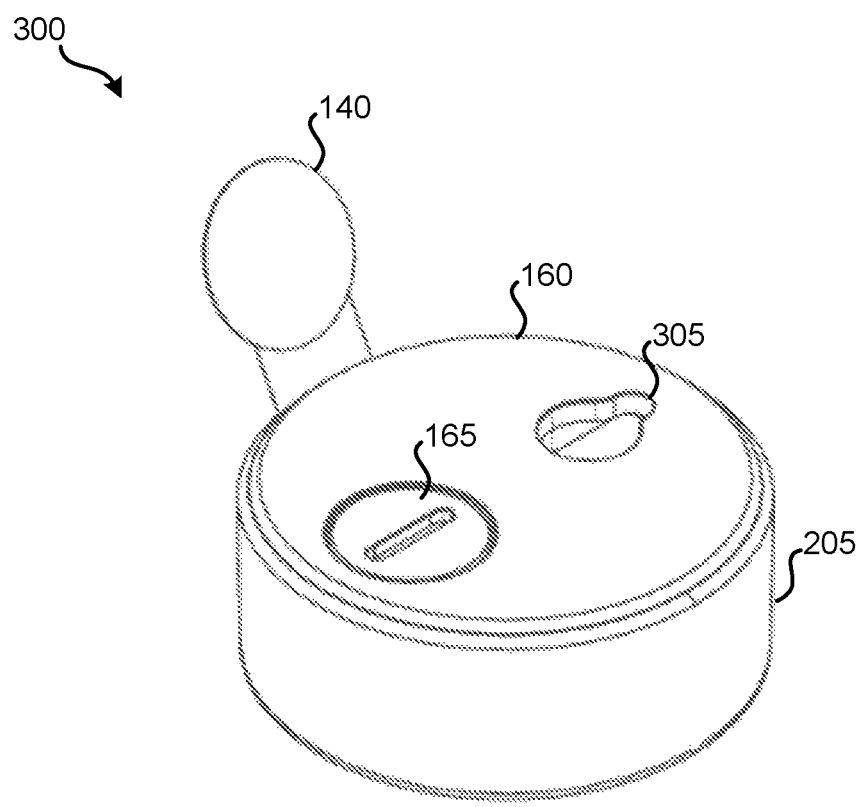
FIG. 3 illustrates a perspective back view of the temperature sensor device.

FIG. 3 illustrates a perspective back view 300 of temperature sensor device 100. When assembled, only backplate 160, housing 105, and battery pull tab 140 (if not already removed and discarded) may be visible to a user. A user's sole access into device 100 may be by actuating coin screw 165. Backplate 160 may be a flat surface such that backplate 160 can be placed flush to a surface, such as a horizontal surface (e.g., table, shelf) or vertical surface (e.g., wall). Backplate 160 may be coated or formed using a thermoplastic polyurethane (TPU). At least a portion of backplate 160 may be slightly compressible. Backplate 160 may have a relatively high coefficient of static friction such that when backplate 160 is placed flush with a horizontal surface, device 100 is unlikely to be accidentally slid off of the surface (i.e., backplate 160 is non-slip).

Backplate 160 may be formed such that mounting hole 305 is present. Mounting hole 305 may include a first portion having a larger diameter and a second portion having a smaller diameter. The first portion may be sized to accommodate a flange of double flange screw 170 being inserted and removed through mounting hole 305. The second portion may be sized such that the flange cannot be inserted or removed from backplate 160. Rather, to remove the flange, a user may slide backplate 160 relative to double flange screw 170 such that the flange is within the first portion of mounting hole 305.

Figure 4A:
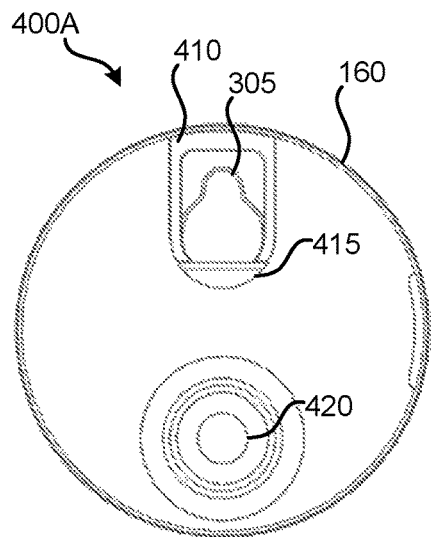
FIGS. 4A-4D illustrate views of a backplate of the temperature sensor device.
Figure 4B:
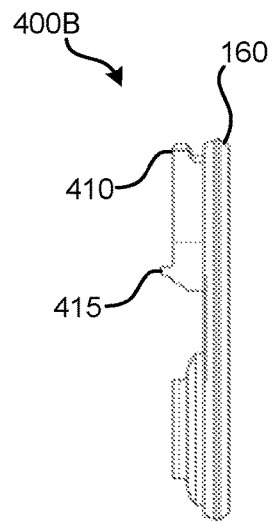
Figure 4C:
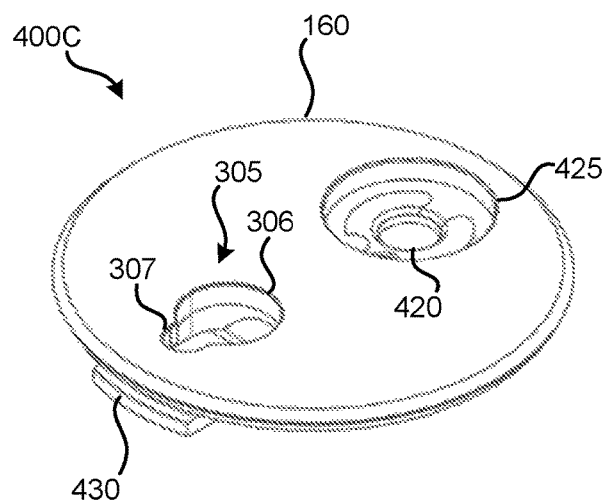
Figure 4D:
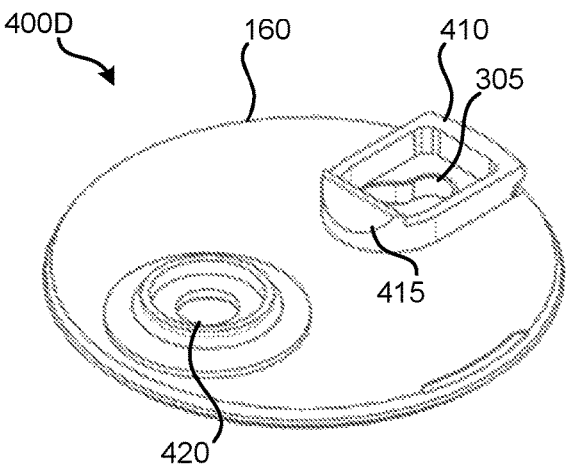

FIGS. 4A-4D illustrate views of a backplate of the temperature sensor device. FIG. 4A illustrates a two-dimensional view 400A of the internal side of backplate 160; FIG. 4B illustrates a side view 400B of backplate 160; FIG. 4C illustrates a perspective view 400C of an external side of backplate 160; and FIG. 4D illustrates a perspective view 400D of an internal side of backplate 160. Mounting hole 305 may be positioned on backplate 160 such that in two-dimensional view 400A, a center of gravity of device 100 is located directed below mounting hole 305. As such, when a screw or other form of fastener is inserted in mounting hole 305, device 100 may be self-leveling. By virtue of the center-of-gravity of device 100 being vertically below mounting hole 305 when backplate 160 is flush with a wall (or other horizontal surface), device 100 may tend to remain leveled.

Figure 11:
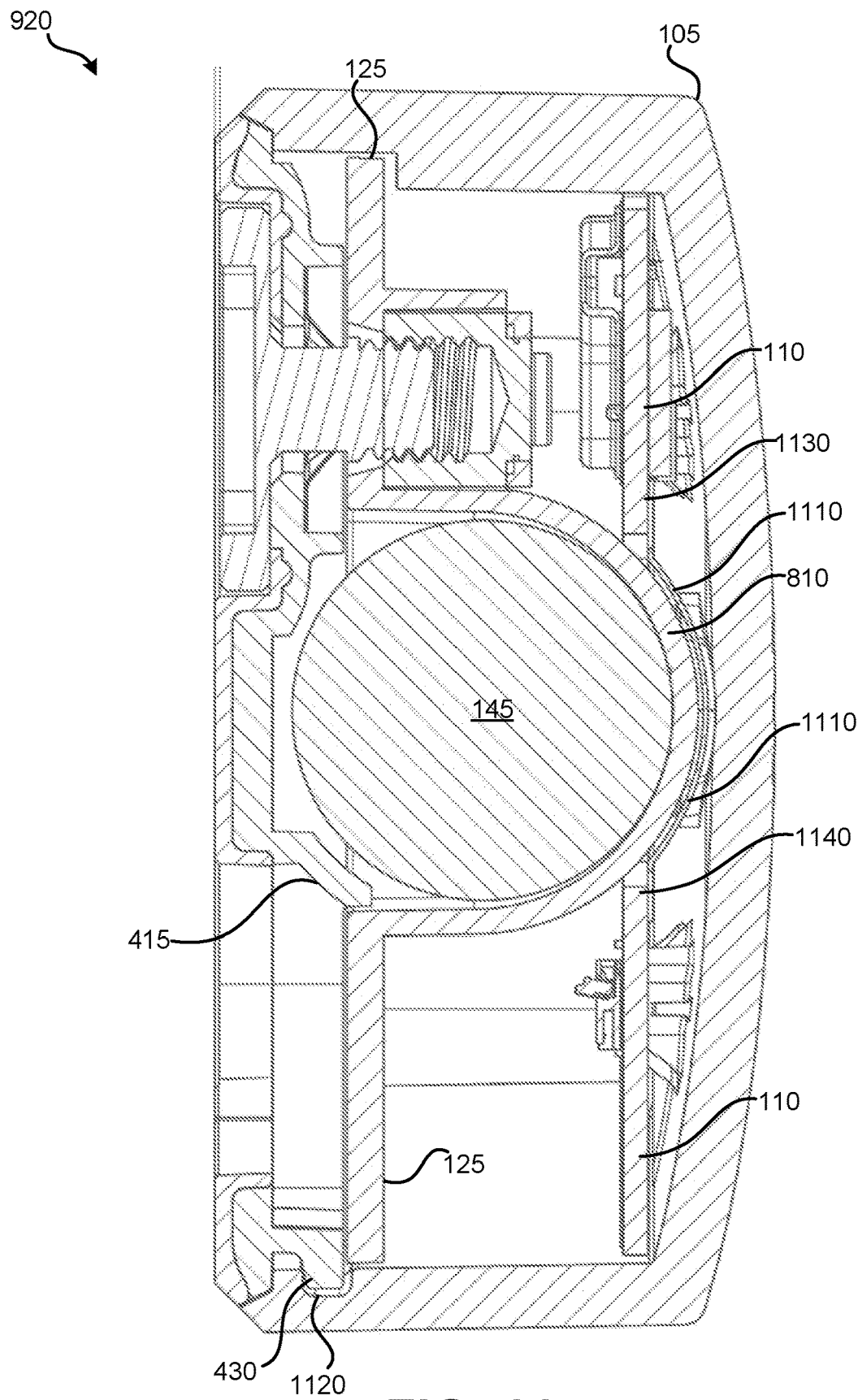
FIG. 11 illustrates a second cross section of the temperature sensor device.

Present on the internal side of backplate 160 may be guard 410 and guard lip 415 (which is also visible in FIG. 11). Guard 410 may at least partially encircle mounting hole 305 on an internal side of backplate 160. Guard 410 may help prevent a misaligned screw from contacting any internal componentry of device 100. Further guard 410 may serve as a visual barrier such that a user looking into mounting hole 305 cannot see any internal components of device 100. Similarly, guard lip 415 may help prevent a screw being inserted into mounting hole 305 from contacting any internal componentry, such as battery 145, of device 100. Guard lip 415 may further help guide the screw into mounting hole 305. Further, guard lip 415 may serve as a visual barrier such that a user looking into mounting hole 305 cannot see battery 145 (or any other component of device 100).

Backplate 160 may further form a coin screw hole 420. Coin screw 165 may be installed through coin screw hole 420 and permanently coupled with coin screw lock 155. Coin screw lock 155 may permit a user to turn coin screw 165 clockwise and counterclockwise without coin screw 165 coming detached from backplate 160. Such an arrangement may allow a user to tighten and loosen coin screw 165 and remove backplate 160 from device 100; however, coin screw 165 may remain attached with backplate 160 by coin screw lock 155, thus helping to prevent coin screw 165 from being lost or misplaced. Coin screw depression 425 may permit coin screw 165 to be flush with the surface of the external side of backplate 160.

In FIG. 4C, the larger portion 306, which has a larger diameter, and smaller portion 307, which has a smaller diameter, of mounting hole 305 is visible. Larger portion 306 may be used for attaching and detaching device 100 from a screw or other form of fastener. Smaller portion 207 may be used for holding device 100 in position on the screw or other form of fastener.

Tongue 430 may be formed as part of backplate 160. Tongue 430 may be removably insertable into groove 1120

(as shown in FIG. 11) of housing 105. When backplate 160 has been removed from device 100, to reattach backplate 160 to device 100, tongue 430 may be inserted into groove 1120 of housing 105. By tongue 430 being inserted into groove 1120 of housing 105, coin screw 165 may be aligned with threads present on chassis 125 such that back plate 160 is attached in a correct orientation to chassis 125.

Figure 5A:
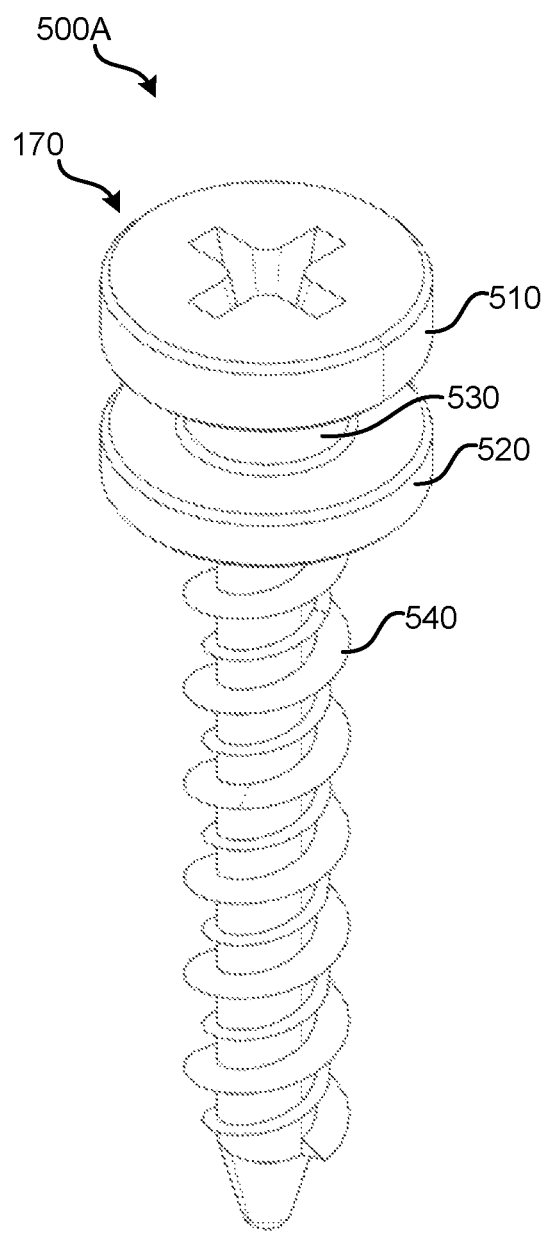
FIGS. 5A and 5B illustrate views of a flanged screw.
Figure 5B:
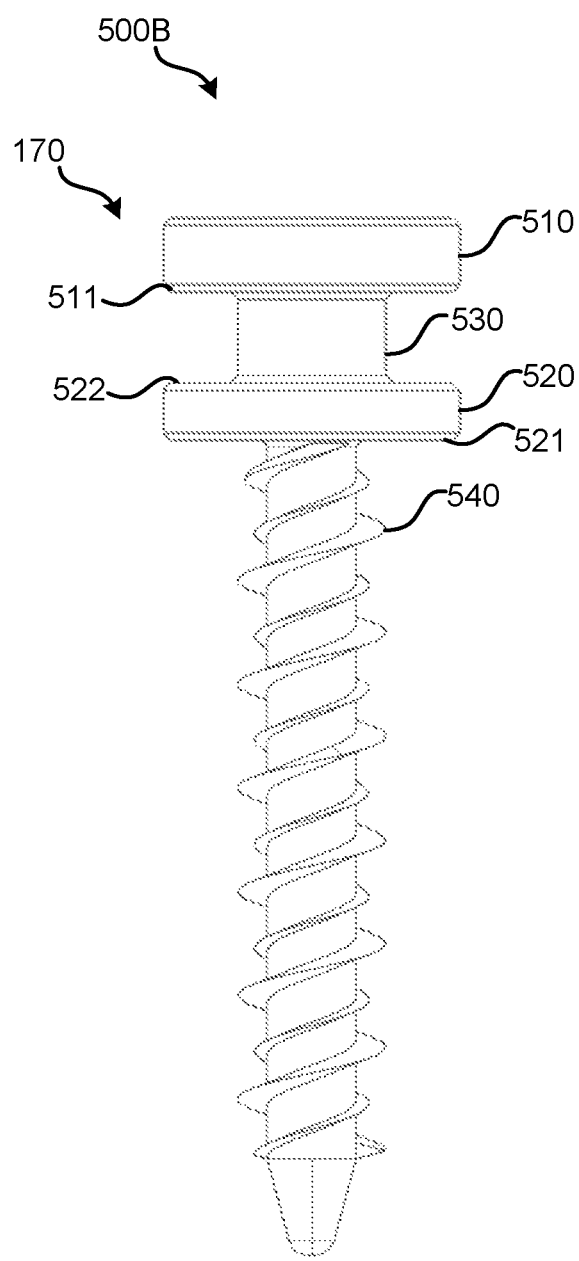

FIGS. 5A and 5B illustrate views of a double flange screw. FIG. 5A illustrates a perspective view 500A of double flange screw 170 and FIG. 5B illustrates a side view 500B of double flange screw 170. Double flange screw 170 may include outer flange 510; inner flange 520; spacer 530; and threads 540. Threads 540 may be used to fasten double flange screw 170 to a vertical (or near vertical) surface, such as a wall. Threads 540 may permit double flange screw 170 to be screwed into the surface as far as a bottom edge 521 of inner flange 520. When fully screwed into a surface, bottom edge 521 may be flush with the surface into which double flange screw 170 has been screwed.

While double flange screw 170 is screwed into a surface, backplate 160 (while attached as part of device 100) may be removably coupled with double flange screw 170. Outer flange 510 may be sized such that it can be inserted and removed from larger portion 306 of mounting hole 305. Outer flange may be sized such that it cannot be inserted or pulled out from smaller portion 307 of mounting hole 305. Outer flange 510 may be spaced by a spacer 530 from inner flange 520. When outer flange 510 is inserted into larger portion 306, device 100 may be moved such that device 100 (or at least backplate 160) is slid and smaller portion 307 is in contact with spacer 530. In such a position, an internal surface of backplate 160 may be pressed against bottom surface 511 of outer flange 510 and the external surface of backplate 160 may be pressed against upper surface 522 of inner flange 520. When a user moves device 100 such that smaller portion of 307 of mounting hole 305 is present between outer flange 510 and inner flange 520, a material (e.g., TPU) of backplate 160 may be partially compressed. This partial compression may increase friction and help hold device 100 in a particular position. Further, the pressure applied by the compression may help device 100 remain parallel or approximately parallel to the surface into which screw 170 has been screwed.

In some embodiments, a magnet may be incorporated within device 100, such as on chassis 125. Such a magnet may attract to outer flange 510 when outer flange is in the vicinity of smaller portion 307. The magnet may provide tactile feedback to a user coupling temperature sensor device 100 with double flange screw 170. Such a magnet may cause device 100 to "snap" into location (thus providing tactile feedback to a user) such that spacer 530 is within smaller portion 307.

To remove device 100 (or backplate 160) from double flange screw 170, device 100 may be moved such that outer flange 510 is in portion 306 of mounting hole 305. Backplate 160 and outer flange 510 may then be separated by outer flange 510 passing through portion 306. If a magnet is present as part of device 100 (such as attached to chassis 125), tactile feedback of the magnet disengaging from outer flange 510 may be felt by a user performing the removal.

In some embodiments, outer flange 510 and inner flange 520 are a same diameter. In other embodiments, outer flange 510 and inner flange 520 may be different diameters. In some embodiments, a different form of fastener may be used. For instance, a nail that has a double flange as detailed in relation to double flange screw 170 may be alternatively used.

Figure 6:
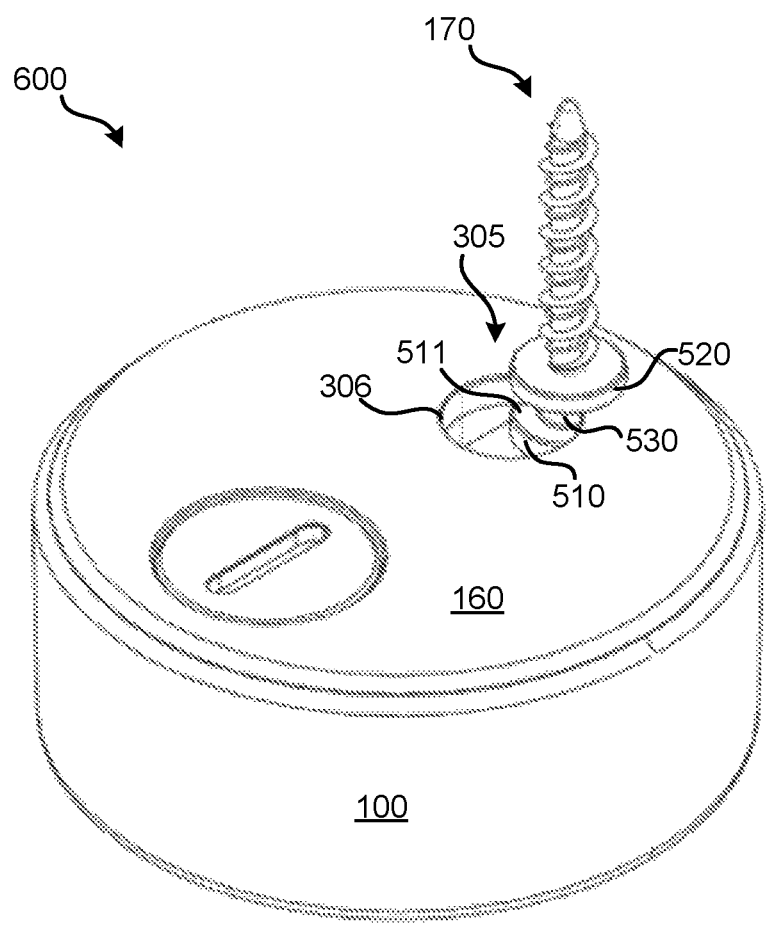
FIG. 6 illustrates a perspective view of the temperature sensor device with a double flange screw installed in the mounting hole.

FIG. 6 illustrates a perspective view 600 of the temperature sensor device with double flange screw 170 installed in mounting hole 305. As can be seen in perspective view 600, outer flange 510, when installed, is within device 100. A portion of backplate 160 may be compressed by pressure exerted by outer flange 510 and inner flange 520 when spacer 530 is moved into smaller portion 307 of mounting hole 305 from larger portion 306.

Further, an edge of smaller portion 307, which may contact spacer 530, may be made from TPU or some other high-fiction material. The TPU along the edge of smaller portion 307 of mounting hole 305 may provide stability via friction to hold device 100 in a particular orientation when mounted to a wall (or other surface) using double flange screw 170.

Figure 7:
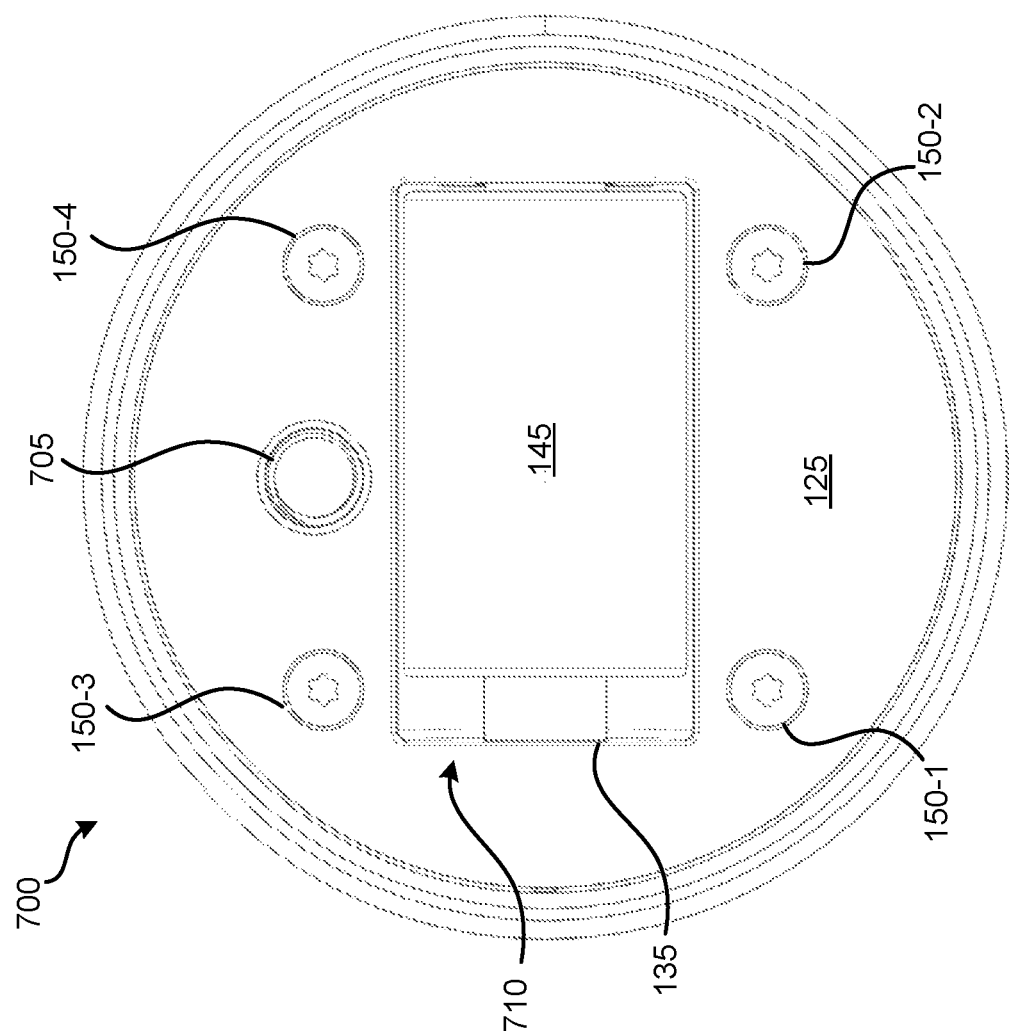
FIG. 7 illustrates a rear view of an embodiment of a temperature sensor device with a backplate removed.

FIG. 7 illustrates a rear view 700 of an embodiment of device 100 with backplate 160 removed. In rear view 700, four chassis screws 150 are visible, which secure chassis to housing 105. Battery 145 may be inserted into battery compartment 710. Within battery compartment 710, negative battery terminal cap 135 may be present. Negative battery terminal cap 135 may provide improved contact with the negative terminal of battery 145, rather than an exposed spring. A spring may be attached with negative battery terminal cap 135 to cause negative battery terminal cap 135 to exert pressure on the negative terminal of battery 145. Coin screw thread structure 175 may removably couple with coin screw 165. As such, when backplate 160 is attached as part of device 100, coin screw 165 may removably hold backplate 160 to chassis 125 via coin screw thread structure 175.

Coin screw 165 allows a user to use an appropriately sized coin to tighten and loosen coin screw 165. It should be understood that in other embodiments, a type of fastener other than a coin screw may be used for coin screw 165. For example, a flathead, Phillips, or other type of screw may be used. A magnet may be used in lieu of (or in addition to) coin screw 165). Other types of fasteners are also possible.

Figure 8:
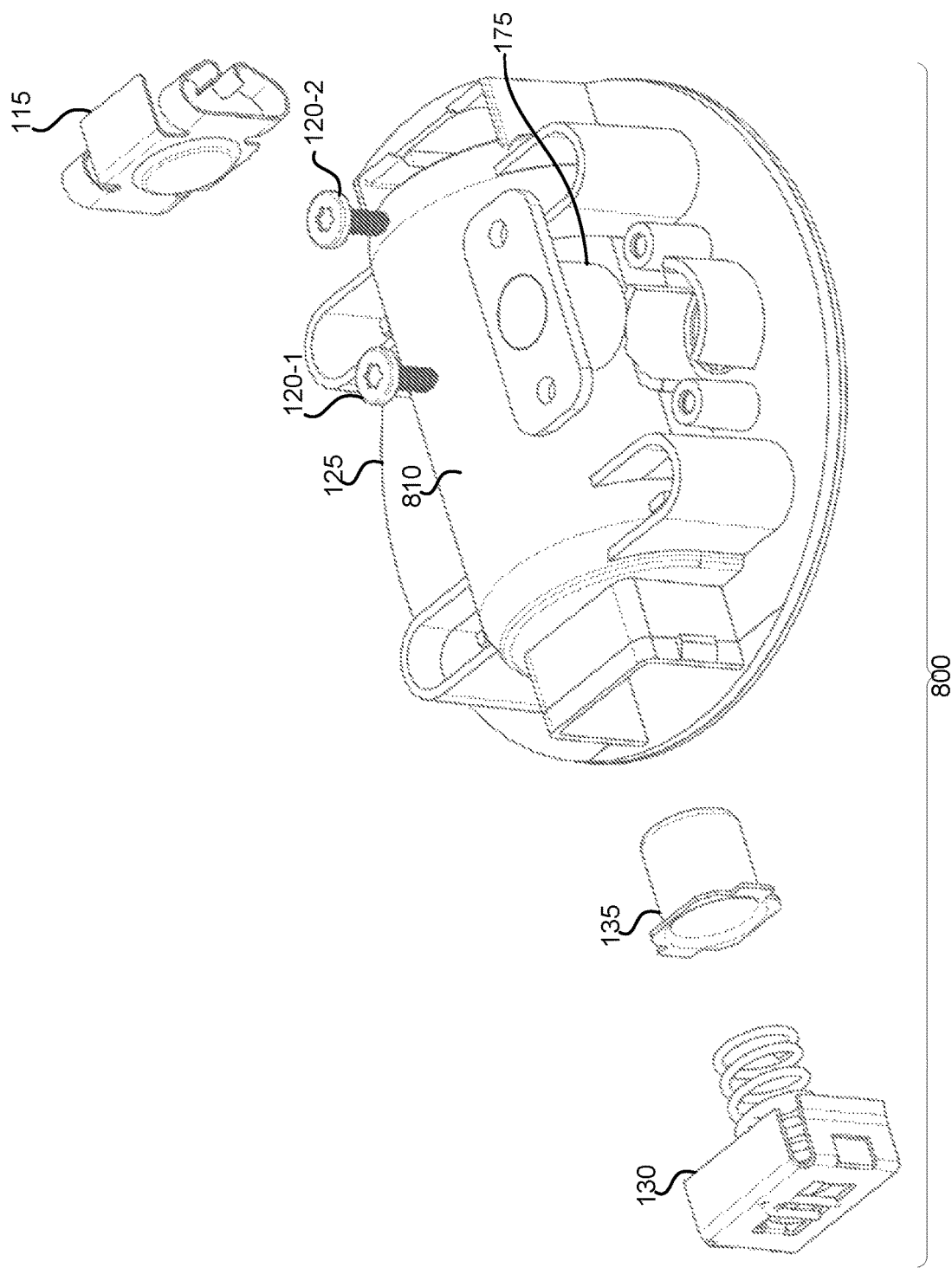
FIG. 8 illustrates an exploded front view of an embodiment of a chassis with battery terminal assemblies.

FIG. 8 illustrates an exploded front view of an embodiment of a chassis with battery terminal assemblies 800. Chassis 125 may have an attached positive battery terminal assembly 115 and an attached negative battery terminal assembly 130. Negative battery terminal assembly 130 may have a negative battery terminal cap attached over a spring of negative battery terminal assembly 130, which may provide better electrical contact with battery 145 by more surface area of negative battery terminal cap 135 touching the negative terminal of the battery than if only a spring was used.

Coin screw thread structure 175 may be formed of a different material than chassis 125. While chassis 125 may be plastic, coin screw thread structure 175 may be metal, which may provide increased wear resistance and structural integrity if coin screw 165 is over tightened. Coin screw thread structure 175 may be anchored to chassis 125 using chassis screws 120 (120-1 and 120-2). In some embodiments, fasteners other than screws may be used to anchor coin screw thread structure 175 to chassis 125. When coin screw 165 is tightened to coin screw thread structure 175, the plate portion of coin screw thread structure 175 may exert pressure on chassis 125 and pull backplate 160 closer to chassis 125.

Chassis 125 may have curved portion 810, which may be arched in shape. Curved portion 810 may serve as part of a battery compartment housing for battery 145. Curved portion 810 may be nonconductive and may help isolate battery 145 from a ground plane of PCB 110, which may be positioned adjacent to chassis 125 within device 100.

Figure 9:
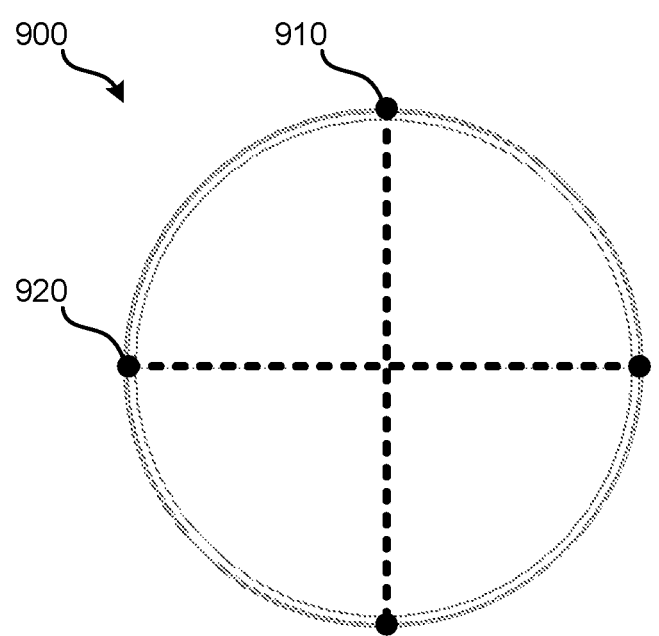
FIG. 9 illustrates two cross sections of a temperature sensor device.
Figure 10:
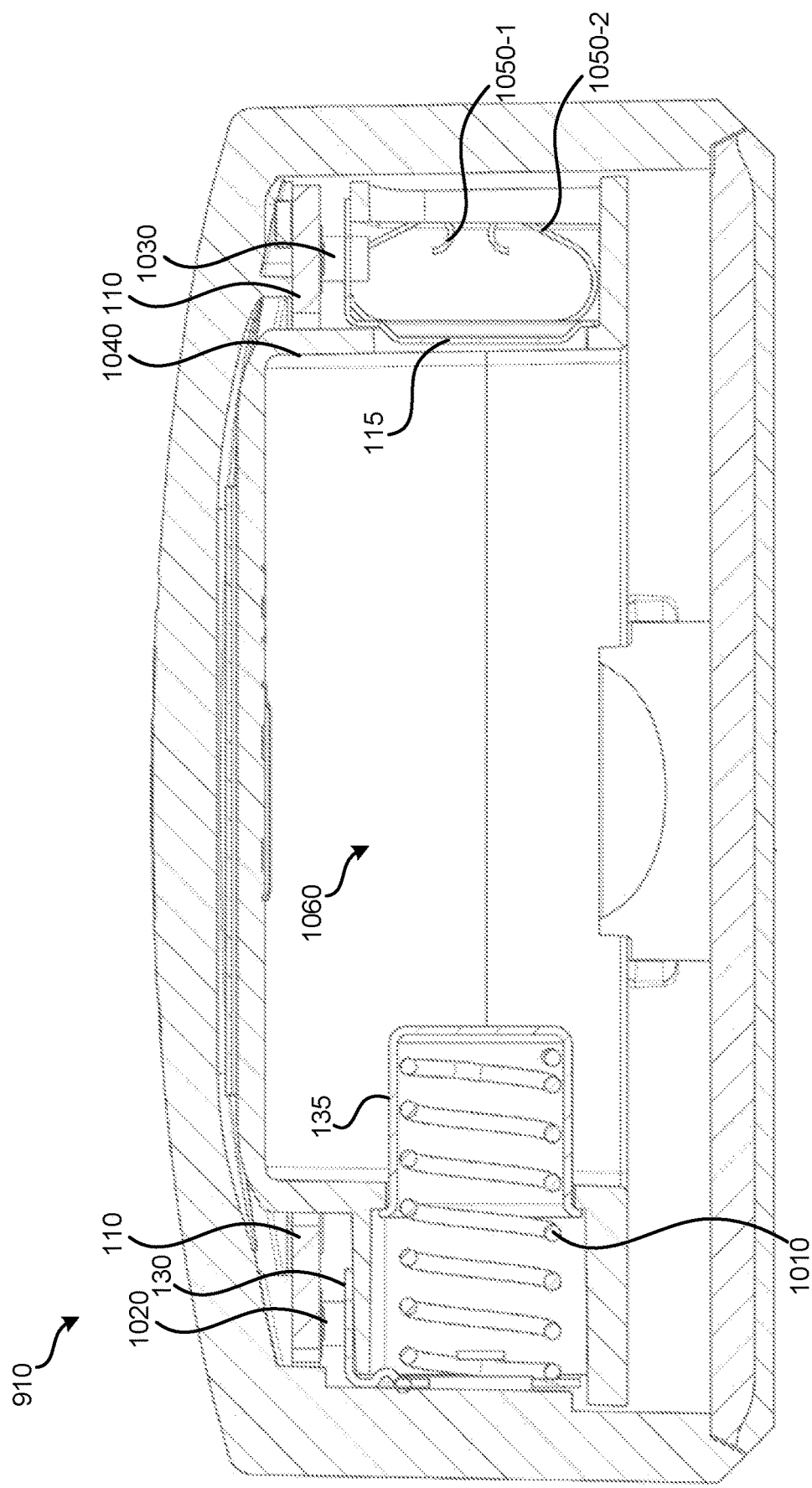
FIG. 10 illustrates a first cross section of the temperature sensor device.

FIG. 9 illustrates two cross-sections of device 100. FIG. 10 illustrates cross section 910 of FIG. 9. In cross section 910, a cross section of spring 1010 of negative battery terminal assembly 130 and negative battery terminal cap 135 is visible. Positive battery terminal assembly 115 may also be spring loaded: portions 1050-1 and 1050-2 may function as springs on positive battery terminal assembly 115 such that when a battery is installed in battery compartment 1060, pressure is exerted on battery 145 by both negative battery terminal assembly 130 and positive battery terminal assembly 115. In the case of a drop or other sudden impact of device 100 while battery 145 is installed, having both positive battery terminal assembly 115 and negative battery terminal assembly 130 may help absorb the shock and help prevent damage to device 100.

Additionally or alternatively, each of the battery terminals may be coupled with redundant leaf springs. Leaf springs 1020 (of which there may be two or more than two) may electrically connect negative battery terminal assembly 130 to contacts on PCB 110. Leaf springs 1020 may serve multiple purposes, including: to electrically connect negative battery terminal assembly 130 to a contact on PCB 110; to allow for assembly of device 100 without soldering or another form of permanent or semi-permanent bond being created between negative battery terminal assembly 130 and PCB 110 (rather, pressure may be used to maintain electrical contact); to increase shock resistance (leaf springs can resist damage due to a sudden drop or other shock); and by using multiple leaf springs 1020, redundancy is introduced such that if a leaf spring breaks or is otherwise damaged, functionality of temperature sensor device 100 may not be affected.

Similarly, leaf springs 1030 (of which there may be two or more than two) may electrically connect positive battery terminal assembly 115 to contacts on PCB 110. Leaf springs 1030 may serve multiple purposes, including: to electrically connect positive battery terminal assembly 115 to a contact on PCB 110; to allow for assembly of device 100 without soldering or another form of permanent or semi-permanent bond being created between positive battery terminal assembly 115 and PCB 110 (rather, pressure may be used to maintain electrical contact); to increase shock resistance (leaf springs can resist damage due to a sudden drop or other shock); and by using multiple leaf springs 1030, redundancy is introduced such that if a leaf spring breaks or is otherwise damaged, functionality of temperature sensor device 100 may not be affected. Leaf springs 1020 and leaf springs 1030 may be mounted onto PCB 110 or may be incorporated as part of negative battery terminal assembly 130 and positive battery terminal assembly 115, respectively. While embodiments detailed herein focus on redundant leaf springs being present, alternative embodiments may have only a single leaf spring for each battery terminal assembly.

Battery compartment 1060 may be configured such that if battery 145 is inserted with reversed polarity, the flat negative battery terminal of battery 145 does not make contact with positive battery terminal assembly 115. In cross section 910 it can be seen that positive battery terminal assembly 115 is recessed from battery housing edge 1040. As such, if a negative battery terminal is present against battery housing edge 1040, the negative battery terminal may not contact positive battery terminal assembly 115. However, when battery 145 is installed correctly, since the positive terminal of battery 145 may have a protrusion, the positive terminal of battery 145 will extend within the recessed region of battery housing edge 1040 and contact positive battery terminal assembly 115. Further, when a battery is installed with correct polarity, positive battery terminal assembly 115 may be compressed due to portions 1050-1 and 1050-2 functioning as springs.

FIG. 11 illustrates cross section 920 of FIG. 9. In cross section 920, groove 1120 and tongue 430 are visible. Cross section 920 further shows curved portion 810 of chassis 125. Curved portion 810 allows for sufficient room for battery 145 to be installed. PCB 110 may not have a center region such that curved portion 810 of chassis 125 can nest or rest within the open region of PCB 110. Such an arrangement can help decrease overall thickness of temperature sensor device 100. PCB 110 may have a curved ground plane 1110 that connects PCB portion 1130 to PCB portion 1140. Curved ground plane 1110 may be a flexible or semi-rigid metallic conductor that extends a ground plane of PCB 110 from PCB portion 1130 to PCB portion 1140 in a curved path such that curved portion 810 of chassis 125 can be nested in the open region of PCB 110. Curved ground plane 1110 may help improve radio performance. One or more wireless transceivers and associated antennas may be situated on PCB 110. In order to improve antenna performance, a ground plane of PCB 110 may be extended using curved ground plane 1110.

Figure 12:
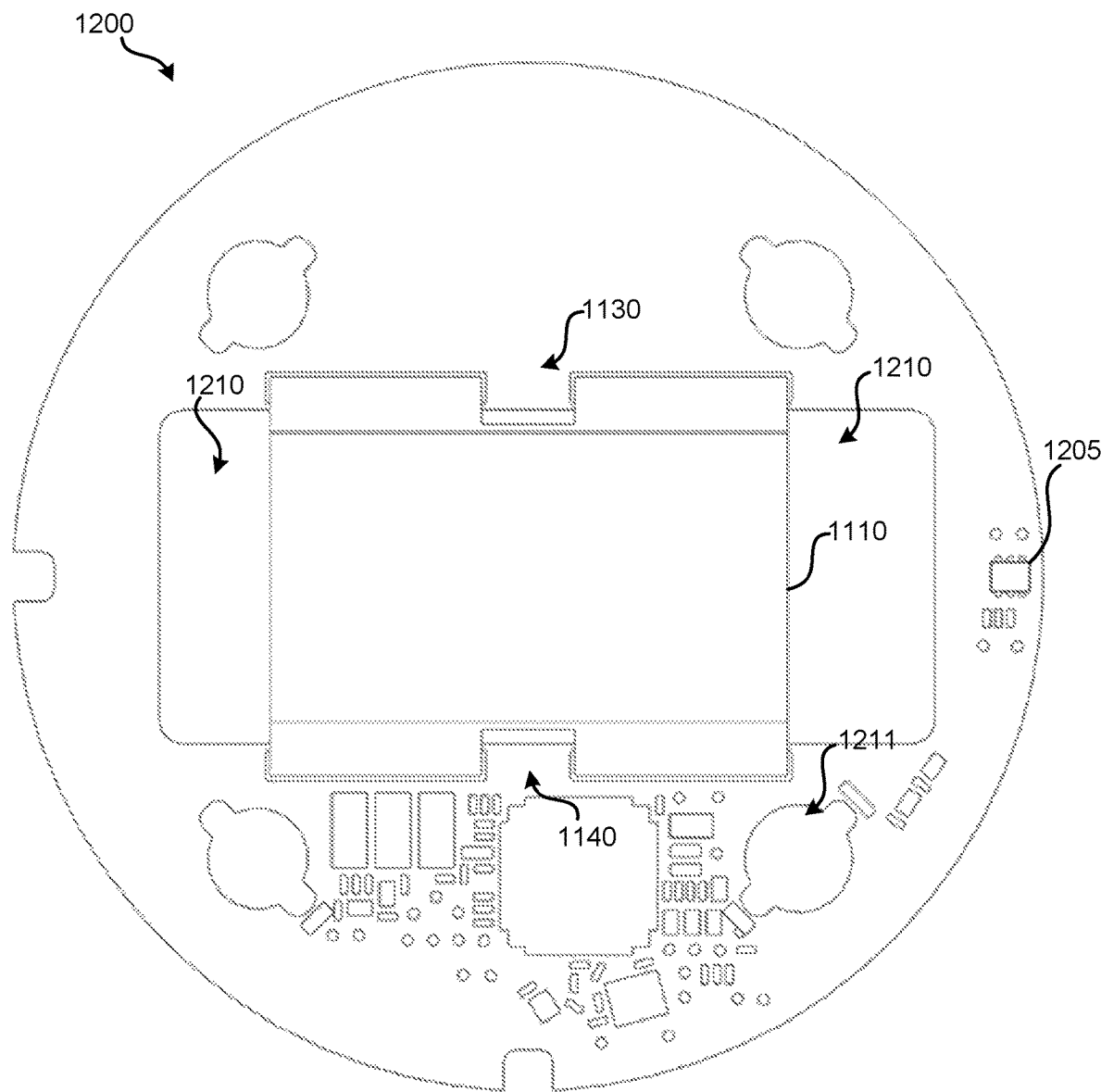
FIG. 12 illustrates an embodiment of a first surface of the PCB of the temperature sensor device.

FIG. 12 illustrates an embodiment of first surface 1200 of PCB 110. First surface 1200 of PCB 110 may face an internal surface of housing 105. On first surface 1200 of PCB 110 may be temperature sensor 1205. Temperature sensor 1205 may be isolated from other components on PCB 110 to help prevent heat generated by other components from affecting the temperature measurements made by temperature sensor 1205. Temperature sensor 1205 may be located proximate to an internal surface of housing 105. Temperature sensor 1205 may be placed such that no other heat-generating components are nearby on PCB 110. Further, open region 1210 and screw cutout 1211 may help isolate heat transfer from other components on PCB 110 to temperature sensor 1205. That is, the distance from computerized components in regions 1310 and 1320 (as illustrated in FIG. 13) is increased by temperature sensor 1205 being on the opposite side of PCB 110 and by open region 1210 and screw cutout 1211 eliminating a straight path on PCB 110 between temperature sensor 1205 and regions 1310 and 1320.

Since temperature sensor 1205 is attached to PCB 110 and housing 105 may be formed from a single piece of material with no holes present, temperature sensor 1205 may not be in direct communication with air in the ambient environment of device 100. Rather, a portion of housing 105 near temperature sensor 1205 may be thinned to help allow temperature sensor 1205 to accurately sense the temperature in the vicinity of device 100. Further, no thermal paste may be present between temperature sensor 1205 and housing 105. Despite temperature sensor 1205 not receiving air circulation through housing 105, a time constant of between 12-16 minutes for temperature sensor 1205 to measure 63% of the ambient temperature of device 110 may be realized.

As show on first surface 1200, curved ground plane 1110 is connected to PCB portion 1130 and PCB portion 1140 such that the ground plane extends across open region 1210. Curved ground plane 1110 may be connected to a ground plane of PCB 110 in multiple locations within PCB portions 1130 and 1140. Curved ground plane 1110 may be at least 75% of the width of open region 1210. In other embodiments, curved ground plane 1110 is between 50%-75% of the width of open region 1210.

Figure 13:
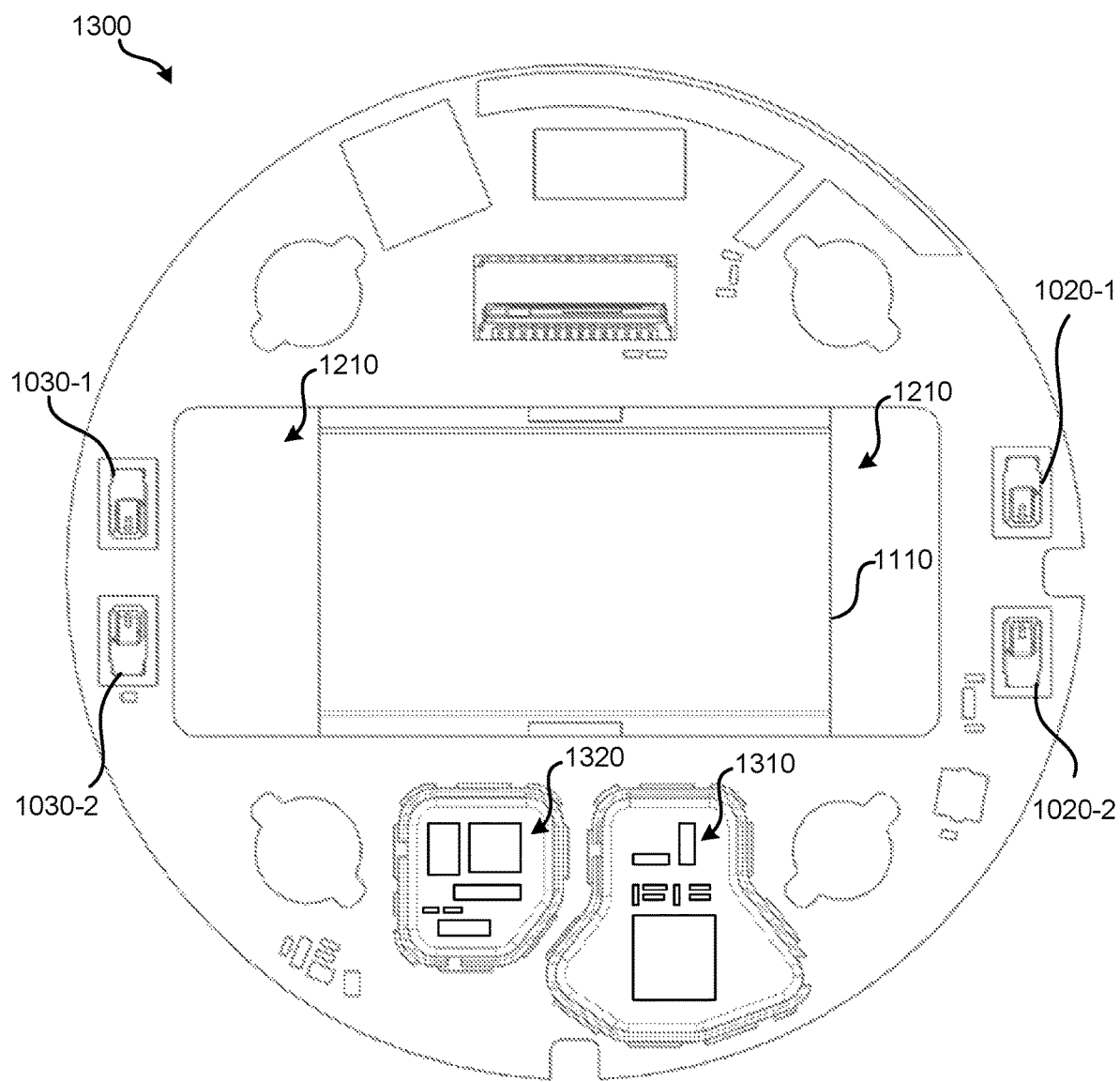
FIG. 13 illustrates an embodiment of a second surface of the PCB of the temperature sensor device.

FIG. 13 illustrates an embodiment of second surface 1300 of PCB 110. Second surface 1300 of PCB 110 may face away from an internal surface of housing 105. On second surface 1300, redundant leaf springs 1030-1 and 1030-2 are soldered (or otherwise attached) to PCB 110; similarly, redundant leaf springs 1020-1 and 1020-2 are soldered (or otherwise attached) to PCB 110. In regions 1310 and 1320, various computerized components may be present, which may be covered in conductive shielding. Such computerized components may include one or more wireless communication interfaces (e.g., Bluetooth®, IEEE 802.11.4, Wi-Fi®, etc.), one or more processors, and/or other computerized components. In some embodiments, a Bluetooth® Low Energy (BLE) transceiver is present. The BLE transceiver may be configured such that it beacons and transmits a temperature measurement infrequently according to a defined and stored schedule, such as once every ten seconds. This period for beaconing may be a maximum or near a maximum permitted under the BLE specification. By transmitting infrequently, the amount of power used by device 100 may be decreased and allow battery 145 to last for two years or longer. A smart thermostat, which may receive the beaconing data transmitted using BLE (or some other communication protocol) may only active a BLE transceiver to listen for the beaconing data from device 100 for ten seconds once every five minutes. In other embodiments, these periods of time may be longer or shorter. Such an arrangement may help conserve power of the thermostat, which may also be operating under significant power constraints. The BLE transceiver of device 100 may transmit at 20 dBm, which may be a maximum or near a maximum power level permitted by the BLE standard. Such a relatively high power level may allow a larger distance to be present between device 100 and a thermostat (or other type of device) with which device 100 communicates.

Figure 14:
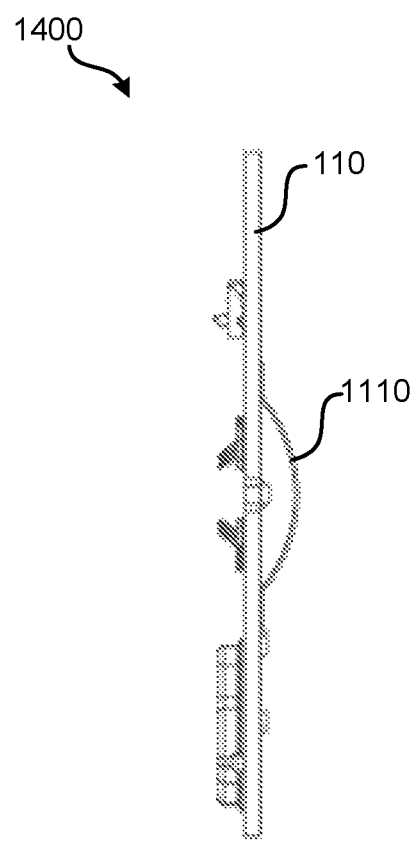
FIG. 14 illustrates an embodiment of a side view of the PCB of the temperature sensor device.

FIG. 14 illustrates an embodiment of a side view 1400 of PCB 110. Side view 1400 of PCB 110 show curved ground plane 1110 extending away from PCB 110 in an arc. Curved ground plane 1110 may extend towards an internal surface of a face of housing 105.

The systems and devices discussed above are examples. Various configurations may omit, substitute, or add various procedures or components as appropriate. Features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the invention.

What is claimed is:

1. A wall mounting system for a wireless sensor device, the wall mounting system comprising:
   a flange fastener comprising a first flange and a second flange, wherein:
      the first flange prevents the flanged fastener from being inserted more than a defined distance into a wall;
      the second flange is removably insertable into a mounting hole present on a backplate of the wireless sensor device; and
      the first flange is located a distance apart from the second flange on the flanged fastener; and
   the backplate of the wireless sensor device, wherein:
      the backplate is at least partially made of a compressible material; and
      a portion of the backplate is configured to be compressed by pressure exerted by the first flange and the second flange when the backplate of the wireless sensor device is attached with the flanged fastener; and
      the backplate is removably attachable to the flanged fastener while the flanged fastener is inserted into the wall.

2. The wall mounting system for the wireless sensor device of claim 1, wherein the backplate is formed such that the mounting hole has a first portion larger than the second flange in diameter and a second portion smaller than the second flange in diameter.

3. The wall mounting system for the wireless sensor device of claim 2, wherein a center of gravity of the wireless sensor device is located directly below the mounting hole in a plane that is parallel to the backplate of the wireless sensor device.

4. The wall mounting system for the wireless sensor device of claim 1, wherein the compressible material is a non-slip thermoplastic polyurethane (TPU).

5. The wall mounting system for the wireless sensor device of claim 1, wherein the wireless sensor device comprises a temperature sensor and the wireless sensor device transmits, using a wireless communication protocol, temperature measurements to a thermostat.

6. The wall mounting system for the wireless sensor device of claim 1, wherein the backplate comprises a permanently-attached screw fastener and the permanently-attached screw fastener attaches to screw threads in a chassis of the wireless sensor device.

7. The wall mounting system for the wireless sensor device of claim 6, wherein:
   the backplate further comprises a protruding tongue and a housing of the wireless sensor device comprises a groove into which the protruding tongue removably fits; and
   when the protruding tongue is removably inserted into the groove, the permanently-attached screw fastener is aligned for screwing into the screw threads in the chassis of the wireless sensor device in a correct orientation.

8. The wall mounting system for the wireless sensor device of the claim 7, wherein:
   the backplate further comprises a guard lip;
   the guard lip protruding from the backplate into the wireless sensor device; and
   the guard lip blocks the second flange from entering a battery compartment of the wireless sensor device.

9. The wall mounting system for the wireless sensor device of claim 1, wherein the flange fastener is a flange screw.

10. A temperature sensor device comprising:
a housing;
a wireless transceiver within the housing;
a battery compartment within the housing;
a temperature sensor within the housing;
a backplate that defines a mounting hole and is at least partially made of a compressible material;
a flange screw comprising a first flange and a second flange, wherein:
the first flange prevents the flanged screw from being inserted more than a distance into a wall;
the second flange is removably insertable into the mounting hole defined by the backplate;
the first flange is located a distance apart from the second flange on the flanged screw;
the temperature sensor device is removably attachable to the flanged screw while the flanged screw is inserted into the wall; and
a portion of the backplate is configured to be compressed by pressure exerted by the first flange and the second flange when the backplate of the temperature sensor device is coupled with the flanged screw through the defined mounting hole of the backplate.

11. The temperature sensor device of claim 10, wherein the backplate is formed such that the mounting hole has a first portion larger than the second flange in diameter and a second portion smaller than the second flange in diameter.

12. The temperature sensor device of claim 11, wherein a center of gravity of the temperature sensor device is located directly below the mounting hole in a plane that is parallel to the backplate of the temperature sensor device.

13. The temperature sensor device of claim 10, wherein the compressible material is a non-slip thermoplastic polyurethane (TPU).

14. The temperature sensor device of claim 10, wherein the temperature sensor device periodically transmits temperature measurements according to a defined schedule to a thermostat.

15. The temperature sensor device of claim 14, wherein the temperature sensor device transmits a temperature measurement once every 10 seconds.

16. The temperature sensor device of claim 10, wherein the backplate comprises a permanently-attached screw fastener and the permanently-attached screw fastener attaches to screw threads in a chassis of the temperature sensor device.

17. The temperature sensor device of claim 16, wherein:
the backplate further comprises a protruding tongue and the housing of the temperature sensor device comprises a groove into which the protruding tongue removably fits; and
when the protruding tongue is removably inserted into the groove, the permanently-attached screw fastener is aligned for screwing into the screw threads in the chassis of the temperature sensor device in a correct orientation.

18. The temperature sensor device of claim 16, wherein:
the backplate further comprises a guard lip;
the guard lip protruding from the backplate into the temperature sensor device; and
the guard lip blocks the second flange from entering the battery compartment of the temperature sensor device.

* * * * *